United States Patent [19]
Renaud

[11] 3,801,013
[45] Apr. 2, 1974

[54] FLUID INJECTION DEVICE

[76] Inventor: Alain P. Renaud, Villa "La Cape" Chemin de Beauregard, Aix-en-Provence, France

[22] Filed: Apr. 9, 1973

[21] Appl. No.: 349,543

[30] Foreign Application Priority Data
Jan. 19, 1973 France .................. 73.01942

[52] U.S. Cl. ............... 239/61, 239/414, 137/99
[51] Int. Cl. ............................................. B05b 7/26
[58] Field of Search ............ 239/414, 527, 61, 62; 137/98, 99; 222/134

[56] References Cited
UNITED STATES PATENTS

| | | | |
|---|---|---|---|
| 2,380,827 | 7/1945 | Downs | 239/414 X |
| 2,788,953 | 4/1957 | Schneider | 222/134 X |
| 2,883,996 | 4/1959 | Blewett et al. | 222/134 X |
| 2,986,152 | 5/1961 | Bayer | 137/99 |
| 3,040,992 | 6/1962 | Wiegand | 239/414 |
| 3,753,528 | 8/1973 | Gibbs | 239/61 |

FOREIGN PATENTS OR APPLICATIONS
5,442  11/1932  Australia .................. 239/414

Primary Examiner—Robert S. Ward, Jr.

[57] ABSTRACT

The present invention has as its object an improvement in fluid injection device and more particularly in double injection devices arranged for injecting into a mixing chamber two fluid chemical components which enter into reaction in the said chamber.

Said device comprises two needle injectors placed opposite to inject the said fluid into a common mixing chamber and controlled by volumetric pumps driven by a common motor, and a connection mechanism connected to the said needles so that the opening of a first injector obtained by displacement of its needle when the second injector is closed produces the rapid opening of the second injector by correlative displacement of its needle.

10 Claims, 4 Drawing Figures

FLUID INJECTION DEVICE

The present invention has as its object improvements in fluid injection devices and more particularly in double injection devices intended for injecting into a mixing chamber two fluid chemical components which enter into reaction in the said chamber.

It is well known for the continuous manufacture of chemical products such as polyurethane foam to start from two fluid components, to use two needle injectors of known types located face to face and slightly displaced in height so that these components arrive tangentially in the mixing chamber and in the immediate vicinity of one another. The injectors are fed by two volumetric pumps with constant output by a single control motor.

In numerous applications, it is important for the components to arrive in synchronism in the mixing chamber and cease to arrive likewise in synchronism in this chamber whatever the physical property differences of these components and in particular their viscosity differences with a view to obtaining a reactive mixture without excess of one or other component from the very first fraction of the output to the very last fraction at the end of the flow. Generally, this synchronism of arrival of the components is obtained by one of the following methods.

In the first method, the components are each pushed into a stocking tank feeding a pump and they arrive at the mixing chamber by means of a two way valve. The feed pumps operate permanently and the components, before the beginning of the operation, are recycled, that is to say, sent again to their stocking tanks through one of the said valves. At the instant of flow, the recycling path is closed and the mixing chamber is fed by the two components. At the end of the flow, the recycling path is again opened and the communication with the chamber is closed. In this realisation, the said valves are connected to one another mechanically and their synchronism of opening and closing ensures the starting or ending of flow synchronism. The drawback of this device is that the permanent recycling of the components generates a rise in temperature which requests a temperature regulation device and a sophisticated and voluminous installation.

In the second method, an adjustable delay is created in the arrival to the injector of one component in respect of the other, this delay being obtained, for example, by modifying in a controlled manner the volume of the delivery circuit. The end of flow is generally obtained in this case by controlled deviation of each of the components returning to the suction apparatus of the pumps. This method requests the putting into operation of the systems with variable volumes and sophisticated and expensive deviations or by-passes.

The injection device according to the invention obviates these drawbacks. In addition it permits of ensuring the instantaneity of opening and closure of the injectors with a precision so that it is possible to realize injections of a very small volume of reactive mixture in a very short time.

According to the invention, there is provided a mechanical connection with low time constant between the needles of the two injectors which keep the two injectors closed in the absence of feeding but which, as soon as one of the injectors opens by sending the first component into the mixing chamber, causes the almost immediate opening of the second injector and reciprocally.

The invention will better understood by referring to the following description and the attached drawings in which.

In all these figures, the same elements have the same reference numerals.

Figure 1:
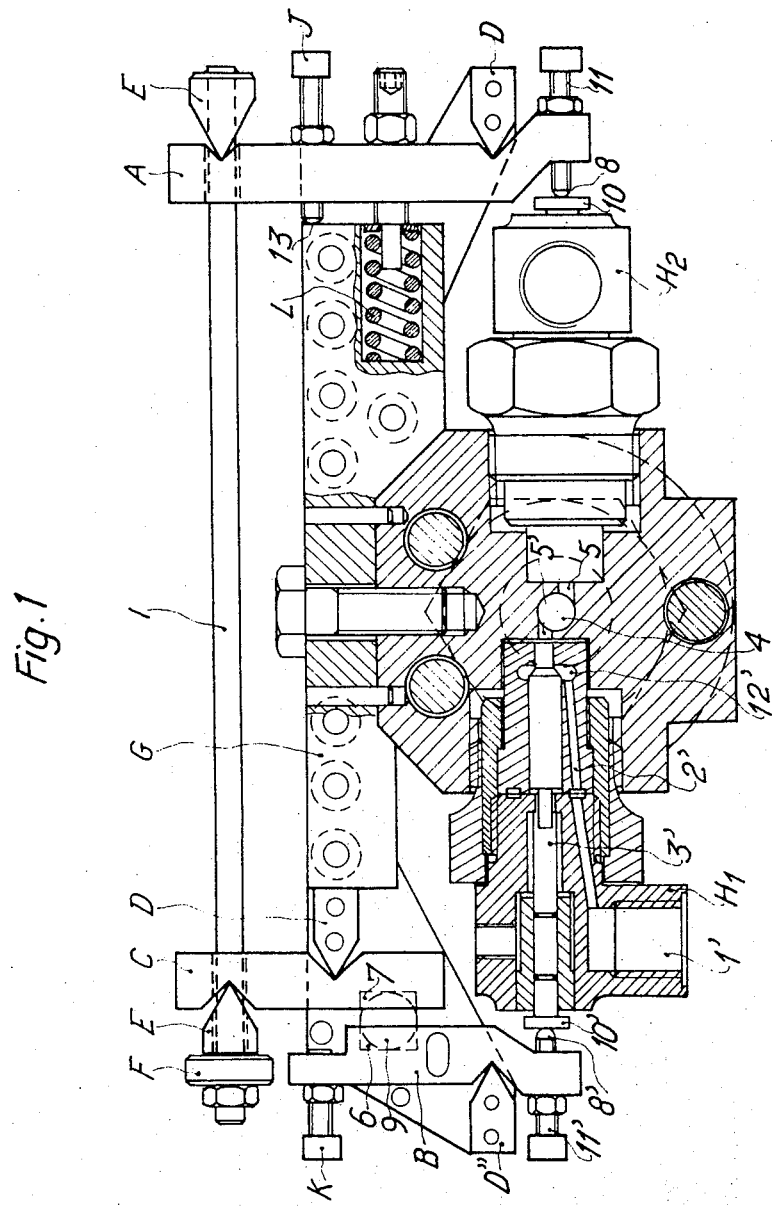
FIG. 1 shows a view in partially cut elevation of an injection device with mechanical connection of the injectors according to the invention.

In FIG. 1, the two injectors are shown at H1 and H2, the injector H1 being shown in axial section. These two injectors being of identical manufacturing, the injector H1 will be described. This injector of well known type comprises a fluid intake 1' and an inner channel 2' leading into an annular volume of fluid 12'.

The needle 3' of the injector has a head 10'. This needle is pushed onto its seating by a force which is applied to it by means of the head 8' of the screw 11'. When this needle is pushed to the left by the pressure of fluid in the volume 12' which is exercized against the tension which is applied to it, it disengages a conical orifice or cam, not shown, which allows the fluide which arrives into the mixing chamber to pass along a tangential trajectory 5'. The two injectors are slightly disposed vertically so that the trajectories 5 and 5' are adjoining and cause a movement of rapid rotation of the mixture. This arrangement is well known in this technique.

The connection device between the injectors according to the invention comprises the pieces A, B, C, a rod I and a spring L. The pieces A and C are articulated about respective blades D and D'. The piece 1 is in addition connected to a compression spring L. The rod I is articulated on the pieces A and C so as to transmit the movement of the articulation point of one of these pieces to the point of articulation of the other. The piece B is articulated about the blade D''. The pieces B and C are connected together by a ball 9 placed in two recesses 6 and 7 of the said pieces which transmit the movement of one of these pieces at the point of tangency of this ball. It is clear that the assembly of the pieces C and B constitute a reversal device of direction of displacement. The pieces A and B come into contact with the heads 10 and 10' of the needles of the injectors by means of the screws 11 and 11'. There is provided in addition another blade E' controlled by a nut F and two regulating screws J and K the role of which will be indicated hereinafter.

The operation of this device is as follows. In the absence of injection, the spring L rests on the piece 1 and consequently the head 8 of the screw 11 connected to the piece A rests on the head 10 of the needle of the injector H2. The thrust exercized by the spring L on the piece A is transmitted by the rod I and the pieces C and B to the head 8' of the screw 11' which comes to rest on the head 10' of the needle of the injector H1. The two injector needles are therefore applied to their seating by a single spring L the force of which is transmitted for H2 by the piece A and for H1 by the piece A, the rod I and the pieces C and B. The equilibrium of the force of the spring between the two injector needles is ensured by the rod I the length of which may be corrected by means of the blade E' controlled by the nut F, the counter blade E being fixed. The pieces A, B, C, I which have to distribute and transmit the force of the spring L work very much below their elastic limit not undergoing any permenent deformation.

If now the driving motor of the pumps is started these latter deliver and increase in pressure. It will be assumed, for example, that the speed of increase of the component sent to the injector H1 is greater than that of the component sent to the injector H2 due in particular to the difference of viscosity of these components. In this case, the injector H1 opens, the needle 3' is pushed to the left, the head 10' of the needle provides an increased pressure on the head 8' of the screw 11', the piece B turns around the blade D" in clockwise direction, the piece C' turns around the blade D' in the opposite direction, the rod I is displaced to the left and the piece A turns around the blade D in counterclockwise direction against the compression spring L. The head 10 of the needle is therefore released from the spring force and it is displaced to the right under the action of the pressure existing in the chamber 12 opening the injector H2. The mobile assembly not having any play or mechanical friction, the synchronism of flow output is ensured.

The mechanical connection device is reciprocal in the sense that the opening of the injector H2 drives that of the injector H1 as is easy to see by a reasoning similar to the preceding.

At the end of the flow, the driving motor of the pumps is stopped and the pressure of the components in the injector drops. If, for example, the pressure on the injector H2 drops first, a part of the force of the spring which is applied to it will be released and will be brought back by means of the pieces A, B, C, I to the head 10' of the needle of the injector H2. This is only when the total force of the spring L is greater than the sum of the counter pressures of the two injectors which these latter will close. This realized therefore the synchronism of closing of the injectors at the end of the flow.

There is provided in addition a device permitting of varying the temperature of the components on their arrival in the mixing chamber by variation of the loss of corresponding charge. For this purpose, there are provided two screws J and K connected to the respective pieces A and C and corresponding fixed stops one of which is shown at 13. These stops limit the displacement of the said screws and consequently the displacement of the heads 10 and 10' of the needles of the injectors therefore the opening of the injectors. This limitation of the displacement of the said screws is adjustable in a distinct manner for the injectors H1 and H2 by rotation of the said screws. Such a regulation permits of modifying within certain limits the speed of reaction of the mixture and giving it the optimum value.

A fluid injection device has just been described comprising two needle injectors the needles of which are connected to one another by a connection and mechanical reaction device permitting of synchronizing the beginning and end of the injection. This mechanical device comprises a system of regulation of the equilibrium of the forces exercized on the needle before the beginning of the injection. This device however has been for the use of a delicate regulation for an average operator. A variation of the injection device of FIG. 1 will now be described comprising another regulating device easier to put in operation permitting of balancing the forces exercized on the needles before the beginning of the injection operation.

Figure 2:
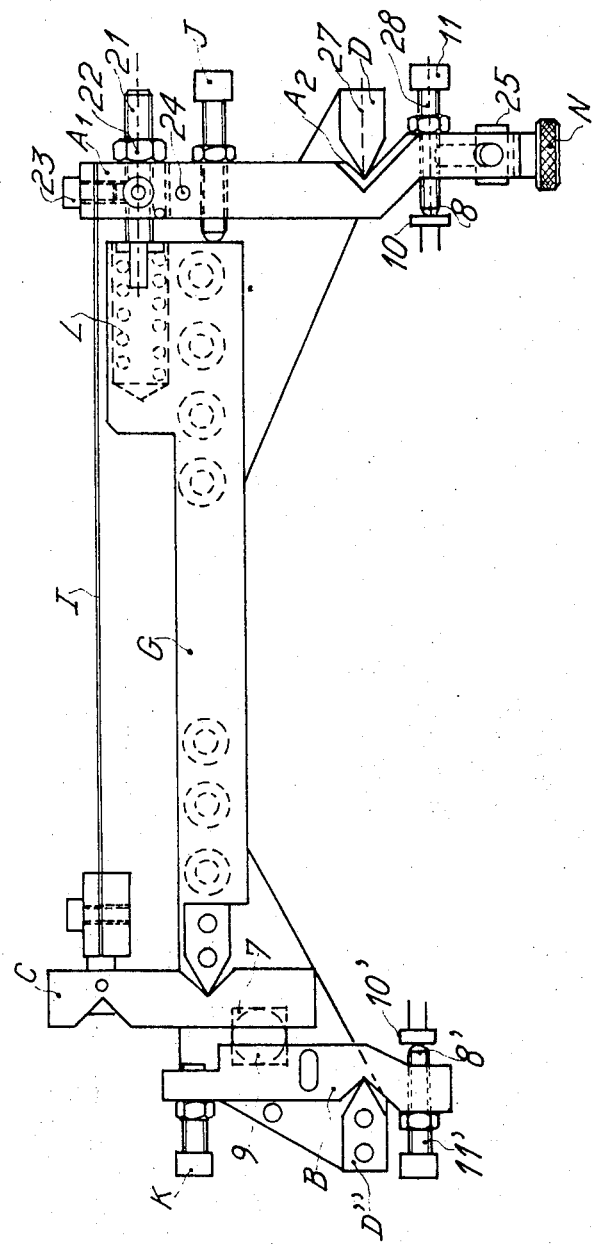
FIG. 2 shows a view in elevation of a variation of the injection device of FIG. 1.

In FIG. 2, the connection piece A with the first needle head 10 is replaced here by an assembly of two pieces A1 and A2, the piece A1 being capable of turning about the axle 24 with regard to the piece A2. The piece A2 is in contact with the fixed blade D. The connection pieces C and B with the second needle head 10' are the same as previously but the rod I here is a blade or flexible steel ribbon rigidly connected to the pieces A1 and C. The assembly of the pieces A1, I and C therefore no longer forms an articulated parallelogram. It is the blade I which permits of transmitting the force exercized on the pieces A1 and C by the needle heads.

Figure 3:
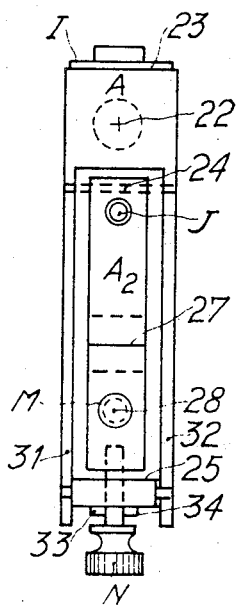
FIG. 3 shows a view in plan of the connection piece with the first needle according to the invention.
Figure 4:
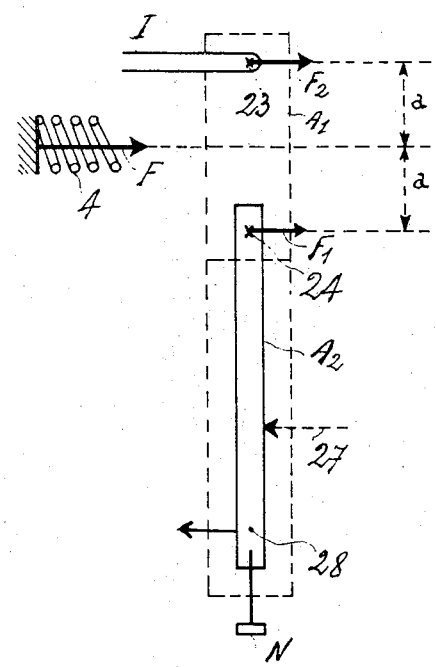
FIG. 4 shows a diagram of forces permitting of understanding better the device and arrangements of FIGS. 2 and 3.

The piece A2 is quite visible in FIG. 3. It may turn about the axle 24 in a plane perpendicular to the plane of the Figure. The screw 11 for contact with the head 10 of the needle of the first injector is fixed to this piece A2. This piece A2 is placed on the inside of the branches 31 and 32 of the piece A1 rigidly connected to the blade I. This piece A2 has a locking screw N which passes into the threaded hole of the part 25 of the piece A1 and which permits of making the two pieces A1 and A2 integral with one another for a determined rotation of A1 in relation to A2 by tightening the screw N on the flanges 33 and 34 of the part 25. The axis of the fixed blade D is shown at 27, the thrust axis on the head 10 of the injector screw 11 at 28, the pressure axis of the spring L at 22 and the plane of the blade I at 23. The spring L pushes the screw 21 engaged in a threaded hole of the piece A1. The axis of this screw 21 is shown at 22. The balance of distribution of the force of the spring L between the two injector needles is ensured automatically as FIG. 4 shows. The force F of the spring L is distributed equally on the two axes or planes 23 and 24. F is split into two equal forces F1 and F2 because, by construction, the distance between the points 23 and 24 and the straight line F are equal. The forces F1 applied at 24 is transmitted to the needle of the first injector by the lever arm equal to the distance of the axes 24 and 27 and the equal force F2 applied at 23 is transmitted to the needle of the second injector to the point 8' by means of the blade I and pieces C and B. The forces exercized on the two needles are equal within the limits of elasticity of the pieces of the mechanical connection device of the needles. The locking of the assembly of the pieces A1 and A2 once the force of the spring distributed equally between the two needles, is obtained by tightening the screw N as indicated above.

What we claim is:

1. Fluid injection device comprising two needle injectors placed opposite to inject the said fluid into a common mixing chamber and controlled by volumetric pumps driven by a common motor, and a connection mechanism connected to the said needles so that the opening of a first injector obtained by displacement of its needle when the second injector is closed produces the rapid opening of the second injector by correlative displacement of its needle.

2. Injection device according to claim 1 wherein the said connection mechanism comprises an articulated parallelogram supported on the heads of the needles of the injectors.

3. Injection device according to claim 1 wherein the said connection mechanism comprises a first piece supported on the head of the needle of the first injector and capable of turning about a first blade, a rod perpendicular to the first piece and articulated by its first end on this first piece, a second piece parallel to the first piece articulated on the second end of the said rod and capable of turning around a second blade and a third reversal of direction of displacement piece connected to the said second piece capable of turning around a third blade and supported on the head of the needle of the second injector so that the displacement of the needle of one of the injectors in one direction controls the displacement of the needle of the other injector in the other direction.

4. Injection device according to claim 3 wherein the said second and third pieces are connected to one another by a ball located in corresponding recesses of the said pieces.

5. Injection device according to claim 1 wherein a fixed compression spring pushes the first piece so as to close the two injectors when the said pumps are not actuated by the motor.

6. Injection device according to claim 1 comprising a mechanical device for limitation of the opening of the injectors adjustable for each injector so as to vary the losses of charge in the passage of the injectors by the corresponding fluids and consequently their temperature at the admission into the mixing chamber.

7. Injection device according to claim 6 in which this limitation device for the opening of the injectors comprises two adjustable screws connected to the first and to the third pieces and associated with two fixed stops.

8. Fluid injection device comprising two needle injectors placed opposite one another so as to inject the said fluids into a common mixing chamber and controlled by volumetric pumps driven by a common motor comprising a connection mechanism connected to the said needles which comprises a first piece of U shape inside the branches of which there is located a fourth piece capable of turning around the said first piece and supported on a first fixed blade and on the head of the needle of the first injector by means of a screw, the said first piece being connected to a flexible metal ribbon itself connected to a second piece capable of turning about a second blade connected to a third reversal of direction of displacement piece capable of turning about a third blade and supported on the head of the second injector.

9. Device according to claim 8 wherein a fixed compression spring pushes the first piece so as to close the two injectors when the said pumps are not actuated by the motor, the thrust force of the spring being equally distributed between the axis of rotation of the fourth piece and the axis of transmission of thrust on the second injector which coincides with the plane of the said flexible metal ribbon.

10. Device according to claim 8, wherein an abutment screw which passes into a threaded hole of a part of the first piece permits of making the first and the fourth piece integral by tightening the said screw for a relative position of these pieces for which the thrust of the said spring is equally distributed on the two needles of the injectors.

* * * * *